(12) United States Patent
Imm

(10) Patent No.: US 9,574,594 B2
(45) Date of Patent: Feb. 21, 2017

(54) FASTENERS

(71) Applicant: IMPERIUS LIMITED, Kidderminster, Worcestershire (GB)

(72) Inventor: Julian Andrew Imm, Kidderminster (GB)

(73) Assignee: Imperius Limited, Worcestershire (GB)

( * ) Notice: Subject to any disclaimer, the term of this patent is extended or adjusted under 35 U.S.C. 154(b) by 79 days.

(21) Appl. No.: 14/370,596

(22) PCT Filed: Jan. 7, 2013

(86) PCT No.: PCT/GB2013/050017
§ 371 (c)(1),
(2) Date: Jul. 3, 2014

(87) PCT Pub. No.: WO2013/102769
PCT Pub. Date: Jul. 11, 2013

(65) Prior Publication Data
US 2015/0003937 A1     Jan. 1, 2015

(30) Foreign Application Priority Data

Jan. 6, 2012  (GB) .................................. 1200187.1

(51) Int. Cl.
| F16B 13/06 | (2006.01) |
| F16B 19/00 | (2006.01) |
| F16B 13/12 | (2006.01) |
| F16B 19/10 | (2006.01) |
| F16B 35/04 | (2006.01) |
| F16B 21/06 | (2006.01) |

(52) U.S. Cl.
CPC ............. *F16B 19/00* (2013.01); *F16B 13/126* (2013.01); *F16B 19/1081* (2013.01); *F16B 35/04* (2013.01); *F16B 21/06* (2013.01)

(58) Field of Classification Search
CPC ......... F16B 13/12; F16B 13/126; F16B 13/06; F16B 13/063
USPC .............................................. 411/57.1, 45–48
See application file for complete search history.

(56) References Cited

U.S. PATENT DOCUMENTS

| 1,700,354 A | * | 1/1929 | Foss ..................... F16B 19/1081 |
| | | | 411/55 |
| 2,353,851 A | * | 7/1944 | Rosan ................... F16B 13/126 |
| | | | 227/52 |

(Continued)

FOREIGN PATENT DOCUMENTS

| GB | 734604 A | 8/1955 |
| GB | 2085516 A | 4/1982 |

(Continued)

OTHER PUBLICATIONS

International Search Report for PCT/GB2013/050017, Mar. 4, 2013.
Search Report for GB Patent Application No. GB1200187.1, May 4, 2012.

*Primary Examiner* — Flemming Saether
(74) *Attorney, Agent, or Firm* — Caesar Rivise, PC

(57) ABSTRACT

A pin for a blind bolt, the pin having a proximal end, a distal end and a shaft between the proximal and distal ends, extending axially from the distal end an outwardly tapered surface and an inwardly tapered surface, the pin comprising a strike portion at the proximal end, wherein the cross sectional area of the strike portion is greater than the cross sectional area of the shaft.

11 Claims, 5 Drawing Sheets

(56) References Cited

U.S. PATENT DOCUMENTS

| | | | | | |
|---|---|---|---|---|---|
| 2,438,533 | A | * | 3/1948 | Booth | F16B 13/126 411/80.6 |
| 4,871,289 | A | * | 10/1989 | Choiniere | E04D 3/3603 411/41 |
| 4,934,885 | A | * | 6/1990 | Woods | F16B 5/0233 24/453 |
| 5,221,167 | A | * | 6/1993 | Girkin | F16B 13/126 411/271 |
| 5,632,581 | A | * | 5/1997 | Hasada | F16B 19/1081 411/48 |
| 6,749,385 | B2 | * | 6/2004 | Yeh | F16B 13/126 411/448 |
| 6,851,492 | B2 | * | 2/2005 | Sato | B23B 51/0027 175/273 |
| 9,217,452 | B1 | * | 12/2015 | Woodall, Jr. | F16B 13/0833 |
| 2005/0183380 | A1 | * | 8/2005 | Sato | B23B 51/0045 52/698 |
| 2008/0014043 | A1 | * | 1/2008 | Zasloff | F16B 13/063 411/41 |

FOREIGN PATENT DOCUMENTS

| | | | |
|---|---|---|---|
| GB | 2424050 | A | 9/2006 |
| JP | 2003130021 | A | 5/2003 |
| JP | 2004332848 | A | 11/2004 |

\* cited by examiner

FASTENERS

BACKGROUND

This invention relates to fasteners and is especially, but not exclusively, related to fasteners for use in securing components to section, e.g. hollow box section, whereby access to the interior of the section is restricted in whole or in part.

A number of fasteners of this kind, which are generally termed blind bolts, are known.

It is an object of the present invention to provide an improvement over known types of fasteners. It is a non-exclusive object of the invention to provide a fastener which, once engaged, has a tendency to continue to force the component and section together. It is a further object of the present invention to provide a fastener which can withstand significant environmental factors such as vibrational forces and so on.

BRIEF SUMMARY

Accordingly, a first aspect of the invention provides a pin for a blind bolt, the pin having a proximal end, a distal end and a shaft between the proximal and distal ends, extending axially from the distal end an outwardly tapered surface and an inwardly tapered surface, the pin comprising a strike portion at the proximal end, wherein the cross sectional area of the strike portion is greater than the cross sectional area of the shaft.

Preferably, the pin comprises an apex at the juncture between the outwardly tapered surface and the inwardly tapered surface.

Alternatively, the pin may comprise a region having a substantially constant cross sectional area between the outwardly tapered surface and the inwardly tapered surface.

In some embodiments, the pin may comprise a second outwardly tapered surface extending axially from the distal end and between the inwardly tapered surface and the shaft.

Preferably, the outwardly tapered surface, the inwardly tapered surface and, if present, the second outwardly tapered surface provide at least part of a tip having a length L.

Preferably, the inwardly tapered surface has a length of at least approximately 0.25L.

Preferably, the inwardly tapered surface has a length of at least approximately 0.3L, 0.35L, 0.4L, 0.45L, 0.5L, 0.55L or at least approximately 0.6L.

Preferably, the angle between the second outwardly tapered surface and the shaft is greater than the angle between the outwardly tapered surface and the shaft.

Preferably, the distal end of the pin has a narrower cross sectional area than the juncture between the inwardly tapered surface and the shaft or, if present, the second outwardly tapered surface.

Preferably, the pin comprises at least one facing surface, the or each facing surface, preferably, defining a juncture between the shaft and the strike portion.

Preferably, the or each facing surface is orthogonal to the principal axis of the shaft.

Preferably, the or each facing surface faces the distal end of the pin.

Preferably, the pin comprises a single facing surface which extends about the entire periphery of the pin.

In other embodiments the facing surface of the pin tapers outwardly towards the proximal end such that the cross sectional area of the strike portion is greater than the cross sectional area of the shaft.

Preferably, the pin comprises a unitary body.

Preferably, one or more of the pin, the shaft, the strike portion, the proximal end or the distal end is circular in cross-section. Other cross-sectional shapes such as triangular, rectangular or elliptical may be envisaged without departing from the present invention.

In a second aspect the invention provides a pin for a blind bolt, the pin comprising a shaft and a tip at one end of the shaft, the tip having a length L, extending axially in a direction towards the shaft the tip comprises successively an outwardly tapered surface and an inwardly tapered surface, wherein the inwardly tapered surface has a length of at least approximately 0.25L.

Preferably, the inwardly tapered surface has a length of at least approximately 0.3L, 0.35L, 0.4L, 0.45L, 0.5L, 0.55L or at least approximately 0.6L.

Preferably, the pin further comprises a strike portion at a second end of the shaft.

Preferably, the cross sectional area of the strike portion is greater than the cross sectional area of the shaft.

In a third aspect the invention provides a bolt having a distal end, a proximal end and a longitudinal bore extending therethrough, at the proximal end the bore having a rebate, e.g. for receiving the head of a pin.

Preferably, the rebate extends at least partially about the inner surface of the bolt.

Preferably, the rebate comprises one or more shoulders.

In some embodiments the bolt may comprise a single shoulder extending about the entire inner surface of the bolt.

Preferably, the bolt comprises at least one slot, e.g. an open-ended slot, at or towards the proximal end.

Preferably, the bolt comprises at least two slots, say four slots, each slot being spaced from another by approximately 90° about the periphery of the bolt.

Preferably, the bolt comprises an outer thread.

Preferably, the outer thread extends axially from the proximal end and terminates at least part-way along the length of the bolt.

Preferably, the outer thread terminates at approximately three-quarters along the length of the bolt. More preferably, the outer thread terminates at approximately two-thirds along the length of the bolt.

Preferably, the or each slot extends from the distal end and terminates at or about the region of the outer thread.

Preferably, the bolt comprises one or more feet. The or each foot may extend radially from the distal end and, preferably, terminates with a tapered portion.

Preferably, the or each foot is located within the longitudinal bore.

Preferably, the or each foot is located at or adjacent to an opening of the longitudinal bore at the distal end of the bolt.

Preferably, the or each foot comprises a curved inner surface.

Advantages of providing feet having curved inner surfaces is that contact between the pin and the bolt is maximised, thereby increasing grip and/or friction between the pin and the bolt and/or reducing applied stress on the pin.

Preferably, the bolt comprises at least one pair of flats, e.g. for providing a surface for a spanner to grip the bolt.

Preferably, the bolt comprises a single pair of flats.

Preferably, the pin and/or bolt is formed from steel. However, other alloys or metals may be used provided that the pin and/or bolt has sufficient strength.

Preferably, the pin and/or bolt is heat treated and/or finished with a coating.

In another aspect the invention provides a fastener comprising a bolt and an insertion pin as described above.

Preferably, the fastener further comprises a nut.

BRIEF DESCRIPTION OF THE DRAWINGS

In order that the invention may be more fully understood, a preferred embodiment of a fastener in accordance with the invention will now be described by way of example only and with reference to the accompanying drawings, in which.

DETAILED DESCRIPTION

Figure 1:
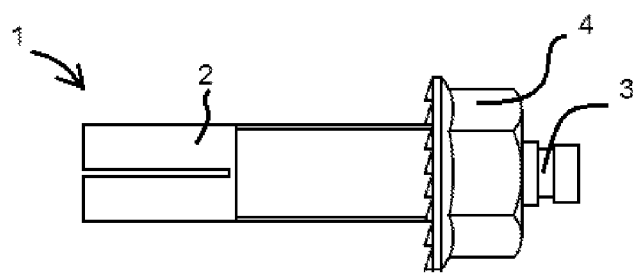
FIG. 1 shows a plan view of a blind bolt.

Referring firstly to FIG. 1 of the accompanying drawings, a blind bolt, indicated generally a 1, comprises a bolt 2, an insertion pin 3 and a nut 4. The bolt 2 has a longitudinal bore 5 extending from one end to the other within which the insertion pin 3 is slidably retained.

Figure 2:
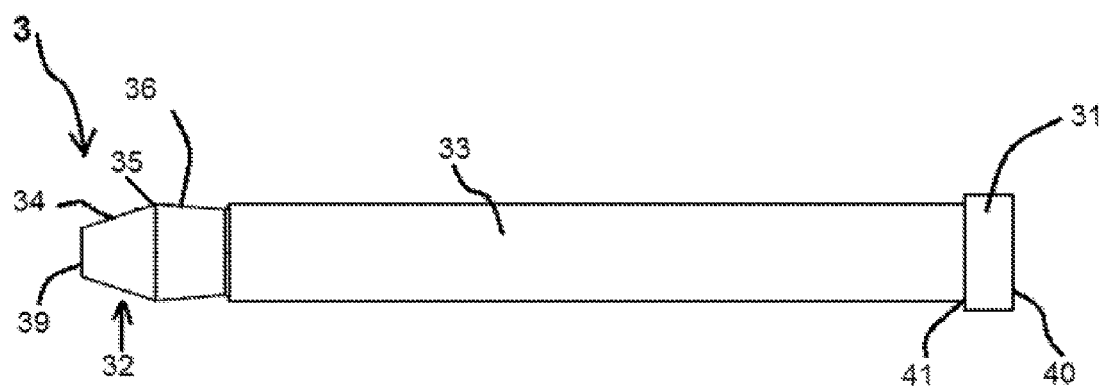
FIG. 2 shows a plan view of an insertion pin.

In FIG. 2, the insertion pin 3 is shown as comprising a proximal end 31 and a distal end 32. The pin 3 also comprises a shaft 33 between the proximal 31 and distal 32 ends. Each component of the pin 3 is circular in cross-section, although other shapes may be envisaged without departing from the scope of the invention. For instance, the pin 3 or shaft 33 or another component may comprise a rectangular, triangular or other suitably shaped cross-section.

Extending axially from the distal end 32, the pin 3 comprises an outwardly tapered surface 34, an apex 35 and an inwardly tapered surface 36.

Figure 3:
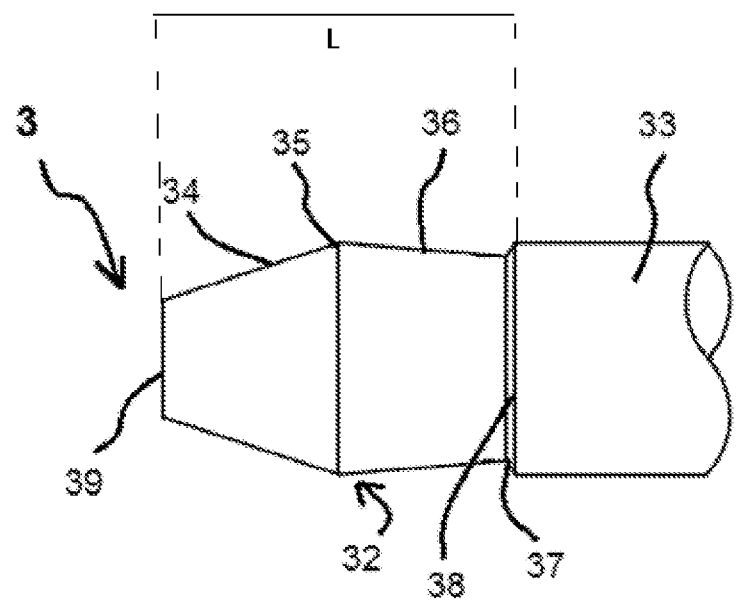
FIG. 3 shows a detailed view of a leading end of the insertion pin of FIG. 2.

In the embodiment being described, and as will be appreciated from FIG. 3 which shows a detailed view of the distal end 32, the pin 3 comprises a second outwardly tapered surface 37 extending axially from the distal end 32 and between the inwardly tapered surface 36 and the shaft 33. The angle between the second outwardly tapered surface 37 and the shaft 33 is greater than the angle between the first outwardly tapered surface 34 and the shaft 33 which results in the second outwardly tapered surface 37 being significantly shorter in length than the first outwardly tapered surface 34.

In some embodiments, the pin 3 need not comprise the second outwardly tapered surface 7. In such embodiments, the inwardly tapered surface 36 is attached directly to shaft 33.

In all embodiments, the narrowest part of the inwardly tapered surface 36 defines a neck 38.

The distal end 32 of the pin 3 comprises a leading face 39. The leading face 39 has a narrower cross sectional area than that of the neck 38.

In the embodiment of FIG. 3 the outwardly tapered surface 34, inwardly tapered surface 36 and second outwardly tapered surface 37 together define a tip having a length L. The inwardly tapered surface 36 has a length of approximately 0.47L.

Referring now back to FIG. 2, the proximal end 31 of the pin 3 comprises a strike face 40. The proximal end 31 has a cross sectional are greater than that of the shaft 33. The pin also comprises a surface 41 which extends orthogonally from the principal axis of the shaft 33. The surface 41 extends about the entire periphery of the pin 3. The surface 41 is thus a juncture between the shaft 33 and proximal end 31.

In alternative embodiments (not shown), the pin 3 need not comprise a surface 41 but instead the pin 3 may comprise any raised area or protuberance. Alternatively, the shaft may gradually taper outwardly towards the strike face to provide a proximal end having a greater cross sectional area than that of the shaft.

Figure 4:
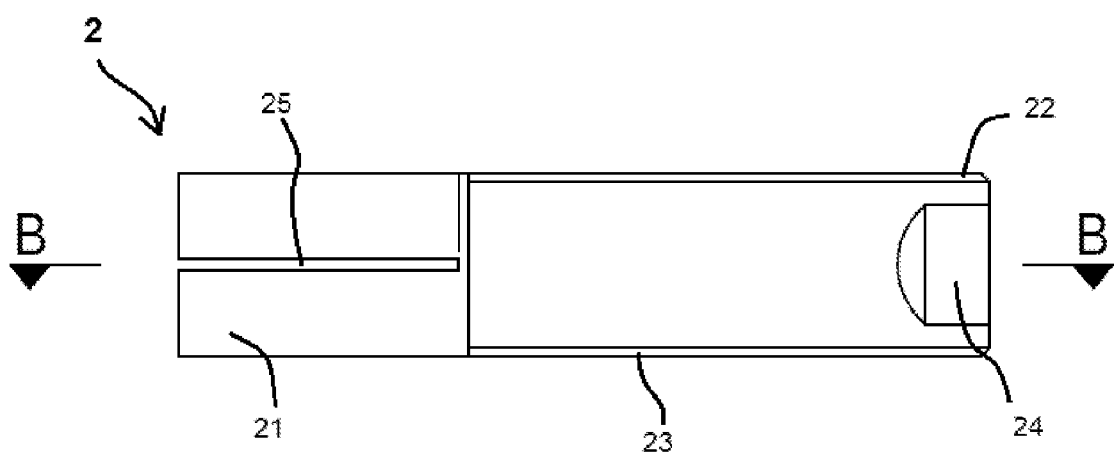
FIG. 4 shows a plan view of a bolt.

In FIG. 4 there is shown a plan view of the bolt 2. The bolt 2 comprises a distal end 21 and a proximal end 22. Extending from the proximal end 22 along approximately two-thirds of the bolt 2, there comprises an outer threaded portion 23, along which the nut 4 can be moved. The proximal end 22 comprises a pair of diametrically opposed flats 24 for enabling a spanner to grip the bolt 2.

The distal end 21 of the bolt 2 comprises a substantially flat outer surface. In some embodiments (not shown), the outer surface of the distal end 21 may comprise one or more circumferential ribs or indentations to provide grip.

Extending axially from the distal end 21, the bolt 2 comprises a plurality of slots 25 extending towards the threaded portion 23. The slots 25 terminate in close proximity to the threaded portion 23.

Figure 5:
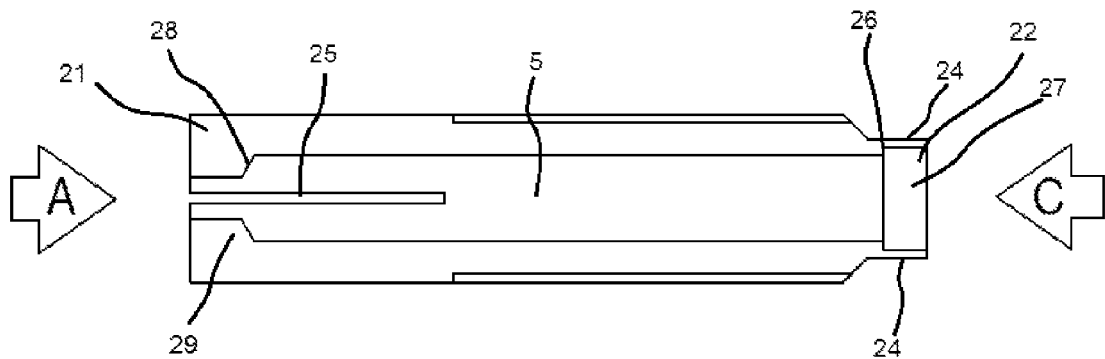
FIG. 5 shows a cross-section of the bolt along the line B-B of FIG. 4.

FIG. 5 shows a cross-section along the line B-B of FIG. 4. As will be appreciated, the longitudinal bore 5 extends through the bolt 2 from the distal end 21 to the proximal end 22. The bore 5 has a substantially constant cross sectional area therealong. However, towards the proximal end 22, the bolt 2 comprises a shoulder 26 extending about a portion of the inner surface. The bolt 2 therefore comprises a rebate 27 having a cross sectional area which is greater than that of the bore 5. The bolt 2 further comprises a plurality of feet 29 extending axially from the distal end 21 and terminating with an inner taper 28. The bolt 2 has an opening at the distal end 21 having a cross sectional area which is narrower than that of the bore 5.

Figure 6:
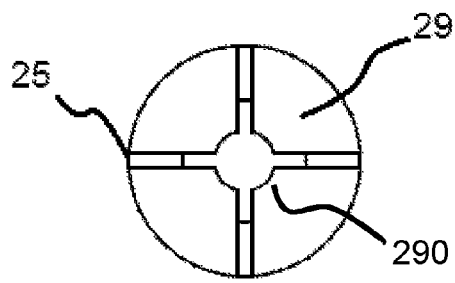
FIG. 6 shows a side elevation of the bolt as viewed along the direction of arrow A of FIG. 5.

In the embodiment being described, and as will be appreciated from FIG. 6, the bolt 2 comprises four slits 25 located at 90° intervals about the periphery thereof. As will be appreciated, each foot 29 comprises a curved inner surface 290 which hugs the periphery of the pin, in use.

Figure 7:
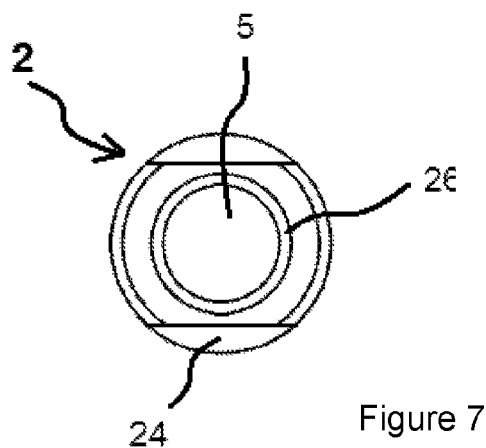
FIG. 7 shows a side elevation of the bolt as viewed along the direction of arrow C of FIG. 5.

FIG. 7 shows the bolt 2 having a pair of diametrically opposed flats 24. FIG. 7 also shows the shoulder 26 extending about the entire portion of the inner surface.

Figure 8:
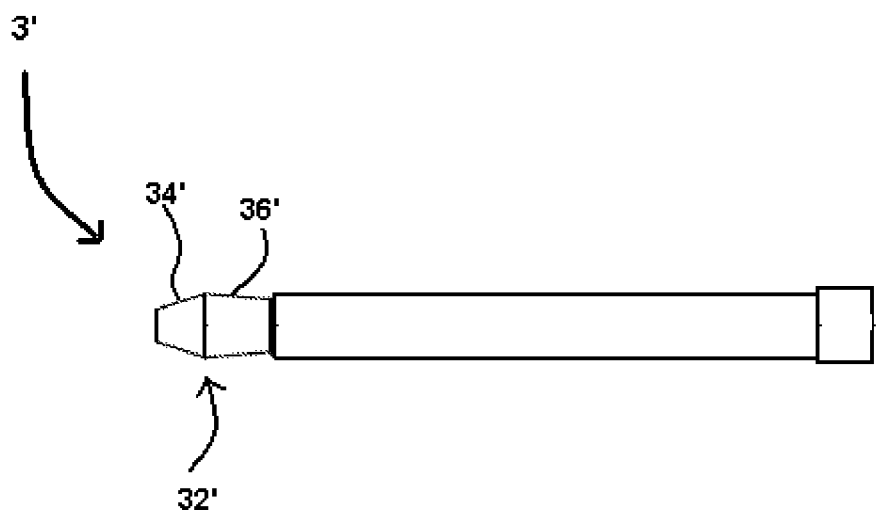
FIG. 8 shows a plan view of an insertion pin of a second embodiment of the invention.
Figure 9:
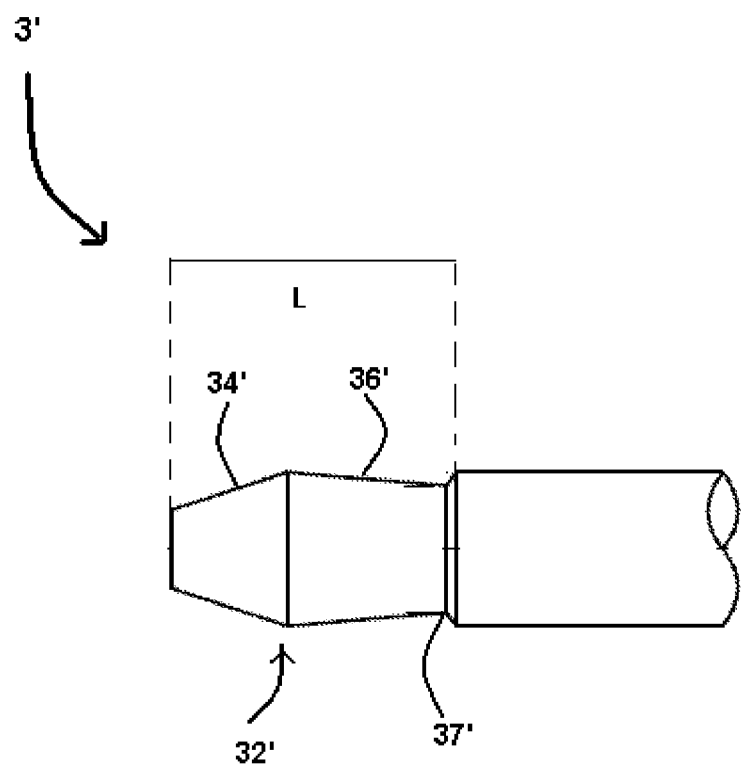
FIG. 9 shows a detailed view of a leading end of the insertion pin of FIG. 8.

FIGS. 8 and 9 show an alternative embodiment of a pin 3' in accordance with the invention. Extending axially from the distal end 32', the pin 3' comprises an outwardly tapered surface 34', an apex 35' and an inwardly tapered surface 36' which together define a tip having a length L. The inwardly tapered surface 36' has a length of approximately 0.56L.

Figure 10:
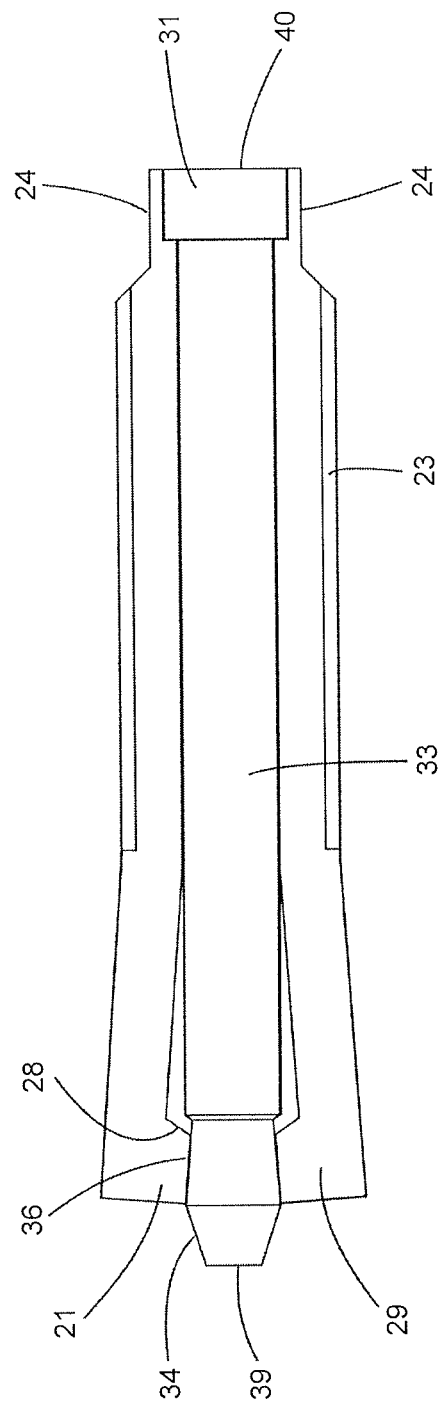
FIG. 10 shows a cross-sectional plan view of a blind bolt assembly having the insertion pin of FIG. 2 and the and bolt of FIG. 5.

Operation of the blind bolt 1 will now be described with particular reference to FIGS. 1 to 4. A user first applies a nut 4 to the proximal end 22 of the bolt 2 and rotates the nut 4 a few turns. The distal end 21 of the bolt 2 is then passed through a component to be fixed to a wall of hollow tubing. The bolt 2 is passed through an opening in the tubing such that the distal end 21 of the bolt 2 stands proud of the inner wall which cannot be easily accessed. The insertion pin 3 is then located partially within the longitudinal bore 5 and the face 40 of the pin 3 is struck, preferably with a hammer. The act of striking the hammer causes pin surface 41 to enter rebate 27 and abut shoulder 26 of the bolt 2. Thus, the strike face 40 of the pin 3 lies flush with the proximal end 22 of the bolt 2. As the pin 3 tunnels through the bore 5, the distal end 32 thereof engages the rear taper 28 of the feet 29 and causes the feet 29 and hence the distal end 21 of the bolt 2 to splay outwardly until the apex 35 of the pin 3 passes the taper 28. See FIG. 10.

The user then continues to rotate the nut 4 such that the nut engages the outer face of the tubing. Continued rotation of the nut 4 cause the outwardly splayed distal end to abut the restricted inner face and thus locks the component to the tubing. A spanner is used to engage the bolt 2 at the flats 24 and the nut 4 is given a further and final tighten which acts to force the bolt 2 back through the opening. This causes the feet 29 of the bolt 2 to bite the inwardly tapered portion 36 of the pin 3 and thus forces the pin 3 to continue forward. However, since the face 41 of the pin 3 abuts the shoulder 26 of the bolt 2 the pin 3 cannot pass through the bore 5. Instead, the bolt 2 and pin 3 act in opposite directions and thus continue to force the component and wall together even after the user has stopped tightening the nut 4.

Of course, when we say that the tip comprises successively an outwardly tapered surface and an inwardly tapered surface, we mean that there could be one or more elements therebetween, e.g. another outwardly tapered surface, another inwardly tapered surface or a surface having a constant cross-sectional area.

The invention claimed is:

1. A blind bolt assembly having a pin and a bolt,
   (a) the pin having:
      (i) distal end;
      (ii) a proximal end;
      (iii) a shaft extending between the proximal and distal ends, the shaft having a cross sectional area;
      (iv) a tip region at the distal end comprising an outwardly tapered surface, and an inwardly tapered surface;
      (v) a strike portion at the proximal end, having a cross sectional area which is greater than the cross sectional area of the shaft; and
   (b) the bolt having:
      (i) a longitudinal bore extending therethrough, the shaft of the pin extending through the longitudinal bore, the longitudinal bore having a distal end and a proximal end;
      (ii) the distal end of the longitudinal bore having at least one foot for contacting, in use, the inwardly tapered surface of the tip region of the pin,
      (iii) the proximal end of the longitudinal bore having a rebate for receiving the strike portion of the pin, and further having an outer threaded portion extending along at least part of its length.

2. A blind bolt assembly as claimed in claim 1, wherein the tip region of the pin includes the outwardly tapered surface and the inwardly tapered surface having a length L.

3. A blind bolt assembly as claimed in claim 2, wherein the inwardly tapered surface has a length of at least 0.2L.

4. A blind bolt assembly as claimed in claim 1, wherein the at least one foot of the bolt is located within the longitudinal bore.

5. A blind bolt assembly as claimed in claims 4, wherein the at least one foot comprises a curved inner surface.

6. A blind bolt assembly as claimed in claim 1, wherein the at least one foot is located at or adjacent to an opening of the longitudinal bore at the distal end of the bore.

7. A blind bolt assembly as claimed in claims 6, wherein the at least one foot comprises a curved inner surface.

8. A blind bolt assembly as claimed in claim 1, wherein the rebate comprises one or more shoulders.

9. A blind bolt assembly as claimed in claim 1, wherein the bolt comprises at least one slot at or adjacent to the distal end of the bore.

10. A blind bolt assembly as claimed in claim 9, wherein the slot is an open ended slot.

11. A blind bolt assembly as claimed in claim 1 in which the outer threaded portion is engageable with an internally threaded nut.

\* \* \* \* \*